(12) United States Patent
Chen et al.

(10) Patent No.: US 9,972,276 B2
(45) Date of Patent: May 15, 2018

(54) DISPLAY DEVICE, DISPLAY SYSTEM AND DISPLAY METHOD

(71) Applicant: BOE Technology Group Co., Ltd., Beijing (CN)

(72) Inventors: Shuo Chen, Beijing (CN); Kailiang Zhang, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 405 days.

(21) Appl. No.: 14/772,856

(22) PCT Filed: Dec. 5, 2014

(86) PCT No.: PCT/CN2014/093167
§ 371 (c)(1),
(2) Date: Sep. 4, 2015

(87) PCT Pub. No.: WO2016/023307
PCT Pub. Date: Feb. 18, 2016

(65) Prior Publication Data
US 2016/0196805 A1    Jul. 7, 2016

(30) Foreign Application Priority Data

Aug. 15, 2014   (CN) .......................... 2014 1 0403639

(51) Int. Cl.
*G09G 5/00* (2006.01)
*G09G 5/391* (2006.01)
(Continued)

(52) U.S. Cl.
CPC ........... *G09G 5/005* (2013.01); *G06F 3/1446* (2013.01); *G06T 3/40* (2013.01); *G09G 5/373* (2013.01);
(Continued)

(58) Field of Classification Search
None
See application file for complete search history.

(56) References Cited

U.S. PATENT DOCUMENTS 7,375,954 B2 * 5/2008 Yang ..................... G06F 1/1616
248/920
7,864,514 B2 * 1/2011 Lee ....................... F16M 11/046
248/602

(Continued)

FOREIGN PATENT DOCUMENTS

CN            1628278 A        6/2005
CN          101315764          * 12/2008
(Continued)

OTHER PUBLICATIONS

Dec. 26, 2016—(CN) First Office Action Appn 201410403639.4 with English Tran.

(Continued)

*Primary Examiner* — Jwalant Amin
(74) *Attorney, Agent, or Firm* — Banner & Witcoff, Ltd.

(57) ABSTRACT

A display device, a display system and a display method are provided. The display device comprises a main display screen, and a ratio of a number of pixels in a transverse direction to a number of pixels in a longitudinal direction of the main display screen is a main display scale. The display device further comprises: a first sub display screen adjoined with the main display screen in the longitudinal direction, and the first sub display screen and the main display screen having the same number of pixels in the transverse direction; and/or, a second sub display screen adjoined with the main display screen in the transverse direction, and the second sub display screen and the main display screen having the same number of pixels in the longitudinal direction.

15 Claims, 7 Drawing Sheets

(51) Int. Cl.
*G06T 3/40* (2006.01)
*G09G 5/373* (2006.01)
*G06F 3/14* (2006.01)
*H04N 7/01* (2006.01)
*G06F 1/16* (2006.01)
*H04N 5/64* (2006.01)

(52) U.S. Cl.
CPC ........... *G09G 5/391* (2013.01); *H04N 7/0122* (2013.01); *G06F 1/1616* (2013.01); *G06F 1/1641* (2013.01); *G09G 5/006* (2013.01); *G09G 2340/0407* (2013.01); *G09G 2340/0414* (2013.01); *G09G 2340/0421* (2013.01); *G09G 2340/0442* (2013.01); *G09G 2360/02* (2013.01); *G09G 2360/04* (2013.01); *H04N 5/64* (2013.01)

(56) References Cited

U.S. PATENT DOCUMENTS

| | | | | |
|---|---|---|---|---|
| 8,760,367 | B2 * | 6/2014 | Yoshino | G06F 3/1438 345/4 |
| 8,908,096 | B2 * | 12/2014 | Aoki | G06F 3/1415 348/556 |
| 9,183,814 | B2 | 11/2015 | Kim | H04N 7/0122 |
| 2003/0169247 | A1 * | 9/2003 | Kawabe | G09G 3/342 345/204 |
| 2005/0190202 | A1 * | 9/2005 | Suzuki | H04N 7/0122 345/660 |
| 2006/0002687 | A1 * | 1/2006 | Thrall | H04N 7/0122 386/336 |
| 2007/0247792 | A1 * | 10/2007 | Yang | G06F 1/1616 361/679.27 |
| 2008/0259209 | A1 * | 10/2008 | Houlgate | H04N 5/44591 348/461 |
| 2009/0207195 | A1 * | 8/2009 | Chin | G09G 5/391 345/699 |
| 2010/0060665 | A1 * | 3/2010 | Wang | G09G 5/391 345/660 |
| 2010/0064244 | A1 * | 3/2010 | Kilpatrick, II | G06F 1/1616 715/773 |
| 2011/0248975 | A1 * | 10/2011 | Takuma | G09G 3/3225 345/207 |

FOREIGN PATENT DOCUMENTS

| | | |
|---|---|---|
| CN | 101315764 A | 12/2008 |
| CN | 101937325 A | 1/2011 |
| CN | 101944352 A | 1/2011 |
| CN | 102184723 A | 9/2011 |
| CN | 102484123 A | 5/2012 |
| CN | 102970499 A | 3/2013 |
| CN | 103024315 A | 4/2013 |
| CN | 103258521 A | 8/2013 |
| CN | 203658927 U | 6/2014 |
| CN | 104168437 A | 11/2014 |
| JP | 2007164060 A | 6/2007 |

OTHER PUBLICATIONS

May 5, 2017—(CN) Second Office Action Appn 201410403639.4 with English Tran.

May 22, 2015—International Search Report and Written Opinion App PCT/CN2014/093167 English Tran.

* cited by examiner

DISPLAY DEVICE, DISPLAY SYSTEM AND DISPLAY METHOD

The application is a U.S. National Phase Entry of International Application No. PCT/CN2014/093167 filed on Dec. 5, 2014, designating the United States of America and claiming priority to Chinese Patent Application No. 201410403639.4 filed on Aug. 15, 2015. The present application claims priority to and the benefit of the above-identified applications and the above-identified applications are incorporated by reference herein in their entirety.

TECHNICAL FIELD

Embodiments of the present disclosure relate to a technical field of multi-screen display, and more particularly, to a display device, a display system and a display method.

BACKGROUND

It is shown according to ergonomic studies that, a visual field of human two eyes is a rectangle with an aspect ratio close to 16:9; and therefore, according to such aspect ratio, most of display devices (e.g., TV) in current market usually adopt a widescreen design, that is, a ratio of a number of pixels in a transverse direction to a number of pixels in a longitudinal directions is set to 16:9 for these display devices.

In the case that an aspect ratio of source image signal input to the display device is less than 16:9, for example, in the case that a digital TV standard definition signal having an aspect ratio of 4:3 is input, if it is needed to display the source image signal of 4:3 on the display device of 16:9 in full screen, the source image signal of 4:3 is required to be compressed in the longitudinal direction while no changes happen in the transverse direction, or the source image signal of 4:3 is stretched in the transverse direction while no changes happen in the longitudinal direction; that is, in the case that the source image signal of 4:3 is displayed in full screen in the above two manners, it is inevitable to deform the original image corresponding to the input source image signal. Accordingly, characters displayed by the display device are usually seemed undersized/overweight. If it is desired to keep the source image signal of 4:3 undeformed, a black portion with a certain width is required to be provided on left and right sides of the image on the display screen, which results in that the original larger-sized display device can only display a smaller-sized image.

Similarly, in the case that the aspect ratio of the source image signal input to the display device is greater than 16:9, for example, in the case that a recorded movie signal having an aspect ratio of 21:9 is input, if it is needed to display the source image signal of 21:9 on the display device of 16:9 in full screen, the movie signal of 21:9 is required to be greatly compressed in the transverse direction. That is, in the case that the movie signal is displayed in full screen in the above manner, it is inevitable to terribly deform the image. At present, in order to keep the image corresponding to the source image signal of 21:9 undeformed, the black portion is usually arranged on upper and lower sides of the image on the display screen, which also results in that the larger-sized display device can only display a smaller-sized image.

On such basis, for most of display devices (especially, TV) in current market, only in the case that the source image signal having an aspect ratio of 16:9 is input, people can see images without deformation in full screen. Since aspect ratios of current source image signals generally are 4:3 and 21:9, it is difficult to obtain a satisfying viewing experience in the case that the TV has the aspect ratio of 16:9.

SUMMARY

According to the embodiments of the disclosure, there is provided a display device. The display device comprises a main display screen, a ratio of a number of pixels in a transverse direction to a number of pixels in a longitudinal direction of the main display screen is a main display scale. The display device further comprises: a first sub display screen adjoined with the main display screen in the longitudinal direction, and the first sub display screen and the main display screen having the same number of pixels in the transverse direction; and/or, a second sub display screen adjoined with the main display screen in the transverse direction, and the second sub display screen and the main display screen having the same number of pixels in the longitudinal direction. In the case that an aspect ratio of a source image signal input to the display device is equal to the main display scale, the main display screen displays a display image matching the number of pixels of the main display screen in the transverse direction and the longitudinal direction. In the case that the aspect ratio of the source image signal input to the display device is less than the main display scale, the main display screen displays a first display image matching the number of pixels of the main display screen in the transverse direction and the longitudinal direction, and the first sub display screen displays a second display image matching the number of pixels of the first sub display screen in the transverse direction and the longitudinal direction. In the case that the aspect ratio of the source image signal input to the display device is greater than the main display scale, the main display screen displays the first display image matching the number of pixels of the main display screen in the transverse direction and the longitudinal direction, and the second sub display screen displays the second display image matching the number of pixels of the second sub display screen in the transverse direction and the longitudinal direction.

For example, the main display screen has 1920 pixels in the transverse direction and 1080 pixels in the longitudinal direction; the first sub display screen has 1920 pixels in the transverse direction and 360 pixels in the longitudinal direction; and the second sub display screen has 640 pixels in the transverse direction and 1080 pixels in the longitudinal direction;

For example, the main display screen includes a main frame, the first sub display screen includes a first sub frame, and the second sub display screen includes a second sub frame; first protrusions and/or first grooves are arranged on a side of the main frame facing the first sub frame, second grooves and/or second protrusions corresponding to the first protrusions and/or the first grooves are arranged on a side of the first sub frame facing the main frame; and the first protrusions and/or the first grooves are arranged on a side of the main frame facing the second sub frame, the second grooves and/or the second protrusions corresponding to the first protrusions and/or the first grooves are arranged on a side of the second sub frame facing the main frame.

For example, the display device further comprises: a connecting piece for connecting the main display screen and the first sub display screen or the second sub display screen; the connecting piece includes a first part fixed with the main display screen, and a second part fixed with the first sub display screen or the second sub display screen; and the first part and the second part are rotatably connected to each other.

According to the embodiments of the disclosure, there is provided a display system. The display system comprises a main display module, a ratio of a number of pixels in a transverse direction to a number of pixels in a longitudinal direction of the main module is a main display scale. The display system further comprises: a first sub display module and/or a second sub display module, the first sub display module and the main display module having the same number of pixels in the transverse direction, and the second sub display module and the main display module having the same number of pixels in the longitudinal direction; and a system module, including a signal receiving module, an image judging module and an image processing module, the signal receiving module being configured for receiving an input source image signal, the image judging module being configured for judging an aspect ratio of the source image signal and sending a judgment result to the image processing module, and the image processing module being configured for sending display information according to the judgment result. In the case that the aspect ratio of the source image signal is equal to the main display scale, a display image matching the number of pixels of the main display module in the transverse direction and the longitudinal direction is provided to the main display module and is displayed by the main display module. In the case that the aspect ratio of the source image signal is less than the main display scale, a first display image matching the number of pixels of the main display module in the transverse direction and the longitudinal direction is provided to the main display module, a second display image matching the number of pixels of the first sub display module in the transverse direction and the longitudinal direction is provided to the first sub display module, and the main display module and the first sub display module display the first display image and the second display image, respectively. In the case that the aspect ratio of the source image signal is greater than the main display scale, the first display image matching the number of pixels of the main display module in the transverse direction and the longitudinal direction is provided to the main display module, the second display image matching the number of pixels of the second sub display module in the transverse direction and the longitudinal direction is provided to the second sub display module, and the main display module and the second sub display module display the first display image and the second display image, respectively.

For example, the image processing module includes an image converting sub-module and an image segmenting sub-module. In the case that the aspect ratio of the source image signal is equal to the main display scale, and in the case that a resolution of the source image signal is less than/greater than the number of pixels of the main display module in the transverse direction and the resolution of the source image signal is less than/greater than the number of pixels of the main display module in the longitudinal direction, the image converting sub-module stretches/compresses the source image signal according to the aspect ratio of the source image signal so as to match the number of pixels of the main display module in the transverse direction and the longitudinal direction. In the case that the aspect ratio of the source image signal is less than the main display scale, and in the case that the resolution of the source image signal is less than/greater than the number of pixels of the main display module in the transverse direction and the resolution of the source image signal is less than/greater than a sum of the number of pixels of the main display module and the number of pixels of the first sub display module in the longitudinal direction, the image converting sub-module stretches/compresses the source image signal according to the aspect ratio of the source image signal so as to match the number of pixels of the main display module in the transverse direction, and match the sum of the number of pixels of the main display module and the number of pixels of the first sub display module in the longitudinal direction. In the case that the aspect ratio of the source image signal is greater than the main display scale, and in the case that the resolution of the source image signal is less than/greater than a sum of the number of pixels of the main display module and the number of pixels of the second sub display module in the transverse direction and the resolution of the source image signal is less than/greater than the number of pixels of the main display module in the longitudinal direction, the image converting sub-module stretches/compresses the source image signal according to the aspect ratio of the source image signal so as to match the sum of the number of pixels of the main display module and the number of pixels of the second sub display module in the transverse direction, and match the number of pixels of the main display module in the longitudinal direction. The image segmenting sub-module is configured for: in the case that the aspect ratio of the source image signal is not equal to the main display scale, segmenting the stretched/compressed source image signal into the first display image and the second display image.

For example, the main display module includes a main time sequence controller, the first sub display module includes a first sub time sequence controller, the second sub display module includes a second sub time sequence controller, and the main time sequence controller, the first sub display module and the second sub display module are connected with the image processing module; and the main time sequence controller is configured for receiving the display image or the first display image; the first sub time sequence controller or the second sub time sequence controller is configured for receiving the second display image.

For example, the system module further includes a backlight driving module; and the main display module includes a main backlight module, the first sub display module includes a first sub backlight module, the second sub display module includes a second sub backlight module, and the main backlight module, the first sub backlight module and the second sub backlight module are connected with the backlight driving module.

According to the embodiments of the disclosure, there is further provided a display method for driving the above-described display device to display. The display method comprises: receiving an input source image signal; judging an aspect ratio of the source image signal; and sending display information to the display device according to a judgment result. In the case that the aspect ratio of the source image signal is equal to the main display scale, the display information is sent so that the display image matching the number of pixels of the main display screen in the transverse direction and the longitudinal direction is provided to the main display screen and is displayed by the main display screen. In the case that the aspect ratio of the source image signal is less than the main display scale, the display information is sent so that the first display image matching the number of pixels of the main display screen in the transverse direction and the longitudinal direction is provided to the main display screen, the second display image matching the number of pixels of the first sub display screen in the transverse direction and the longitudinal direction is provided to the first sub display screen, and the main display screen and the first sub display screen display the first display image and the second display image, respectively. In the case that the aspect ratio of the source image signal is greater than the main display scale, the display information is sent so that the first display image matching the number of pixels of the main display screen in the transverse direction and the longitudinal direction is provided to the main display screen, the second display image matching the number of pixels of the second sub display screen in the transverse direction and the longitudinal direction is provided to the second sub display screen, and the main display screen and the second sub display screen display the first display image and the second display image, respectively.

For example, in the case that the aspect ratio of the source image signal is equal to the main display scale, and in the case that the resolution of the source image signal in the transverse direction is less than/greater than the number of the pixels of the main display screen in the transverse direction and the resolution of the source image signal in the longitudinal direction is less than/greater than the number of the pixels of the main display screen in the longitudinal direction: the source image signal is stretched/compressed to match the number of pixels of the main display screen in the transverse direction and the longitudinal direction according to the aspect ratio of the source image signal; in the case that the aspect ratio of the source image signal is less than the main display scale, and in the case that the resolution of the source image signal in the transverse direction is less than/greater than the number of pixels of the main display screen in the transverse direction and the resolution of the source image signal in the longitudinal direction is less than/greater than a sum of the number of pixels of the main display screen in the longitudinal direction and the number of pixels of the first sub display screen in the longitudinal direction: the source image signal is stretched/compressed to match the number of pixels of the main display screen in the transverse direction and match the sum of the number of pixels of the main display screen and the number of pixels of the first sub display screen in the longitudinal direction according to the aspect ratio of the source image signal; and then, the stretched/compressed source image signal is segmented into the first display image and the second display image; and in the case that the aspect ratio of the source image signal is greater than the main display scale, and in the case that the resolution of the source image signal in the transverse direction is less than/greater than a sum of the number of pixels of the main display screen in the transverse direction and the number of pixels of the second sub display screen in the transverse direction and the resolution of the source image signal in the longitudinal direction is less than/greater than the number of pixels of the main display screen in the longitudinal direction: the source image signal is stretched/compressed to match the sum of the number of pixels of the main display screen and the number of pixels of the second sub display screen in the transverse direction and match the number of pixels of the main display screen in the longitudinal direction according to the aspect ratio of the source image signal; and then, the stretched/compressed source image signal is segmented into the first display image and the second display image.

For example, the main display screen has 1920 pixels in the transverse direction and 1080 pixels in the longitudinal direction, the first sub display screen has 1920 pixels in the transverse direction and 360 pixels in the longitudinal direction, the second sub display screen has 640 pixels in the transverse direction and 1080 pixels in the longitudinal direction. In the case that the aspect ratio of the source image signal is 16:9, and in the case that the resolution of the source image signal in the transverse direction is less than/greater than 1920 and the resolution of the source image signal in the longitudinal direction is less than/greater than 1080, the source image signal is stretched/compressed to 1920 pixels in the transverse direction and to 1080 pixels in the longitudinal direction according to the aspect ratio of the source image signal. In the case that the aspect ratio of the source image signal is 4:3, and in the case that the resolution of the source image signal in the transverse direction is less than/greater than 1920 and the resolution of the source image signal in the longitudinal direction is less than/greater than 1440, the source image signal is stretched/compressed to 1920 pixels in the transverse direction and 1440 pixels in the longitudinal direction according to the aspect ratio of the source image signal, then the stretched/compressed source image signal is segmented into the first display image and the second display image, the first display image has 1920 pixels in the transverse direction and 1080 pixels in the longitudinal direction, and the second display image has 1920 pixels in the transverse direction and 360 pixels in the longitudinal direction. In the case that the aspect ratio of the source image signal is 21:9, and in the case that the resolution of the source image signal in the transverse direction is less than/greater than 2560 and the resolution of the source image signal in the longitudinal direction is less than/greater than 1080, the source image signal is stretched/compressed to 2560 pixels in the transverse direction and 1080 pixels in the longitudinal direction according to the aspect ratio of the source image signal, then the stretched/compressed source image signal is segmented into the first display image and the second display image, the first display image has 1920 pixels in the transverse direction and 1080 pixels in the longitudinal direction, and the second display image has 640 pixels in the transverse direction and 1080 pixels in the longitudinal direction.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

FIG. 10(*b*) is a schematic view illustrating Mode II in step S3 of the display method of the display device according to the embodiments of the present disclosure;

FIG. 10(*c*) is a schematic view illustrating Mode III in step S3 of the display method of the display device according to the embodiments of the present disclosure;

FIG. 11(*b*) is an example of the Mode II shown in FIG. 10(*b*); and

FIG. 11(*c*) is an example of the Mode III shown in FIG. 10(*c*).

DETAILED DESCRIPTION

In order to make objects, technical details and advantages of the embodiments of the disclosure apparent, the technical solutions of the embodiment will be described in a clearly and fully understandable way in connection with the drawings related to the embodiments of the disclosure. It is obvious that the described embodiments are just a part but not all of the embodiments of the disclosure. Based on the described embodiments herein, those skilled in the art can obtain other embodiment(s), without any inventive work, which should be within the scope of the disclosure.

Figure 1:
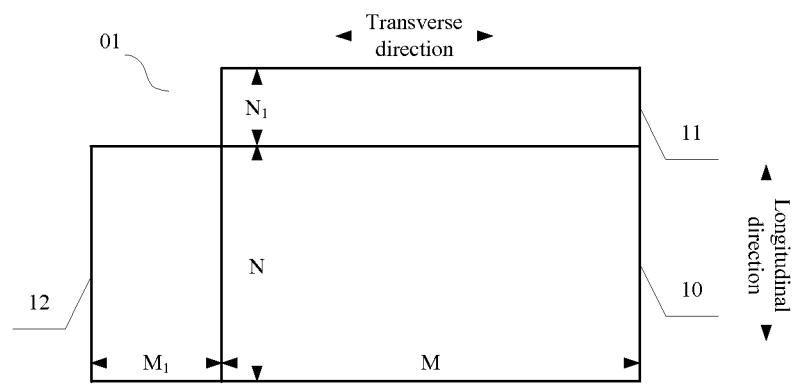
FIG. 1 is a structural schematic view illustrating a display device according to embodiments of the disclosure.

Embodiments of the present disclosure provide a display device 01. As shown in FIG. 1, the display device 01 comprises a main display screen 10, and a ratio of a number of pixels in a transverse direction to a number of pixels in a longitudinal direction of the main display screen 10 is a main display scale. The display device 01 further comprises: a first sub display screen 11 adjoined with the main display screen 10 in the longitudinal direction, and the first sub display screen 11 and the main display screen 10 having the same number of pixels in the transverse direction; and/or, a second sub display screen 12 adjoined with the main display screen 10 in the transverse direction, and the second sub display screen 12 and the main display screen 10 having the same number of pixels in the longitudinal direction.

In the case that an aspect ratio of a source image signal input to the display device 01 is equal to the main display scale, the main display screen 10 displays a display image matching the number of pixels of the main display screen 10 in the transverse direction and the longitudinal direction.

In the case that the aspect ratio of the source image signal input to the display device 01 is less than the main display scale, the main display screen 10 displays a first display image matching the number of pixels of the main display screen 10 in the transverse direction and the longitudinal direction, and the first sub display screen 11 displays a second display image matching the number of pixels of the first sub display screen 11 in the transverse direction and the longitudinal direction.

In the case that the aspect ratio of the source image signal input to the display device 01 is greater than the main display scale, the main display screen 10 displays the first display image matching the number of pixels of the main display screen 10 in the transverse direction and the longitudinal direction, and the second sub display screen 12 displays the second display image matching the number of pixels of the second sub display screen 12 in the transverse direction and the longitudinal direction.

It should be noted that, in FIG. 1, it only shows a case where both the number of the first sub display screen 11 and the number of the second sub display screen 12 are 1. Because the display device has two sides in the transverse direction and the longitudinal direction, respectively, the number of the first sub display screen 11 may be 2, and the number of the second sub display screen 12 may be 2 as well.

In the case that the number of the first sub display screen 11 is 2, the first sub display screen 11 is adjoined with the main display screen 10 on upper and lower sides of the main display screen 10 in the longitudinal direction, respectively. In this case, part of the display image is provided to one of the first sub display screens 11, and the remaining part of the second display image is provided to the other of the first sub display screens 11, that is, the two first sub display screens 11 jointly display the second display image.

In the case that the number of the second sub display screen 12 is 2, the second sub display screen 12 is adjoined with the main display screen 10 on left and right sides of the main display screen 10 in the transverse direction, respectively. In this case, part of the second display image is provided to one of the second sub display screens 12, and the remaining part of the second display image is provided to the other of the second sub display screens 12, that is, the two second sub display screens 12 jointly display the second display image.

It should be noted that, the source image signal input to the display device (e.g., a home television, a personal computer, etc.) has a certain industrial standard. For example, the aspect ratio of the input source image signal may be 16:9, 4:3, 21:9 and so on.

For example, with reference to FIG. 1, taking the first sub display screen 11 as an example, the number of pixels thereof in the longitudinal direction (marked as $N_1$ here and hereinafter) can be flexibly set according to aspect ratios of the common source image signals in the industry.

In the display device described above, in the case that the aspect ratio of the input source image signal is less than the main display scale, a ratio of the number of pixels of the main display screen 10 in the transverse direction (marked as M here and hereinafter) to a sum of the number of pixels of the main display screen 10 in the longitudinal direction (marked as N here and hereinafter) and the number of pixels of the first sub display screen 11 in the longitudinal direction, i.e., $M:(N+N_1)$, is set to be as close as possible to the aspect ratio of the input source image signal. Thus, in the case that the aspect ratio of the input source image signal is less than the main display scale, for the image which is originally displayed in full screen in one screen by a deformation manner of compressing in the longitudinal direction or stretching in the transverse direction, part of the image (i.e., the first display image) is displayed in the main display screen 10, and the other part of the image (i.e., the second display image) is displayed in the first sub display screen 11, which is equivalent to enlarging an effective display region of the display device in the longitudinal direction compared to the display device in the prior art. Accordingly, the input source image signal is slightly stretched in the transverse direction (in this case, the ratio of $M:(N+N_1)$ is slightly greater than the aspect ratio of the input source image signal), or the input source image signal is not stretched at all (in this case, the ratio of $M:(N+N_1)$ is equal to the aspect ratio of the input source image signal).

In a similar way, in the case that the aspect ratio of the input source image signal is greater than the main display scale, a ratio of a sum of the number of pixels of the main display screen 10 in the transverse direction M and the number of pixels of the second sub display screen 12 in the transverse direction (marked as $M_1$ here and hereinafter) to the number of pixels of the main display screen 10 in the longitudinal direction N, i.e., $(M+M_1):N$, is set to be as close as possible to the aspect ratio of the input source image signal. Thus, in the case that the aspect ratio of the input source image signal is greater than the main display scale, for the image which is originally displayed in full screen in one screen by the deformation manner of compressing in the transverse direction or stretching in the longitudinal direction, part of the image (i.e., the first display image) is displayed in the main display screen 10, and the other part of the image (i.e., the second display image) is displayed in the second sub display screen 12, which is equivalent to enlarging the effective display region of the display device in the transverse direction compared to the display device in the prior art. Accordingly, the input source image signal is slightly compressed in the transverse direction (in this case, the ratio of $(M+M_1):N$ is slightly less than the aspect ratio of the input source image signal), or the input source image signal is not stretched at all (in this case, the ratio of $(M+M_1):N$ is equal to the aspect ratio of the input source image signal).

In the display device 01 according to the embodiments of the present disclosure, in one aspect, in the case the aspect ratio of the input source image signal is equal to the main display scale, the main display screen 10 displays the display image without deformation in aspect ratio.

In another aspect, in the case that the aspect ratio of the input source image signal is not equal to the main display scale, since the first sub display screen 11 adjoined with the main display screen 10 is added in the longitudinal direction and/or the second sub display screen 12 adjoined with the main display screen 10 is added in the transverse direction, which is equivalent to enlarging the effective display region of the display device in the longitudinal direction and/or the transverse direction compared to the single display screen in the prior art, the source image signal is displayed in full screen in the manner of the main display screen 10+the first sub display screen 11 or the main display screen 10+the second sub display screen 12; so a deformation amount of the source image signal in the transverse and/or longitudinal direction can be reduced or avoided, and thus a full screen display image with better viewing experience is provided to people.

In addition, the first sub display screen 11 and the second sub display screen 12 are provided, which is equivalent to increasing the effective display region in two directions compared with the single display screen in the prior art; accordingly, no matter in the case that the aspect ratio of the input source image signal is less than the main display scale or in the case that the aspect ratio of the input source image signal is greater than the main display scale, the display device 01 according to the embodiments of the present disclosure displays the source image signal in full screen with little deformation in the manner of the main display screen 10+the first sub display screen 11 or the main display screen 10+the second sub display screen 12 matching the aspect ratio of the input source image signal, so that the display device 01 according to the embodiments of the present disclosure has higher market value, higher availability, and stronger operability.

In addition, considering that a visual field of human two eyes is a rectangle with an aspect ratio close to 16:9, for example, the main display screen 10 has 1920 pixels in the transverse direction and 1080 pixels in the longitudinal direction. That is, the main display scale is 1920:1080=16:9.

In addition, the aspect ratio of the source image signal less than 16:9 and commonly used in current display industry is 4:3. Based on the foregoing descriptions, in the case that the aspect ratio of the input source image signal is less than the main display scale of the main display screen 10, the ratio of $M:(N+N_1)$ is set to be equal to the aspect ratio of the input source image signal, so that the source image signal is displayed in full screen in the manner of the main display screen 10+the first sub display screen and is not deformed at all, and thus human eyes can obtain an optimum viewing experience. In this case, the first sub display screen 11 has 1920 pixels in the transverse direction and 360 pixels in the longitudinal direction; that is, $M:(N+N_1)=1920:(1080+360)=4:3$.

Similarly, the aspect ratio of the source image signal greater than 16:9 and commonly used in current display industry is 21:9. Based on the foregoing descriptions, in the case that the aspect ratio of the input source image signal is greater than the main display scale of the main display screen 10, the ratio of $(M+M_1):N$ is set to be equal to the aspect ratio of the input source image signal, so that the source image signal is displayed in full screen in the manner of the main display screen 10+the second sub display screen and is not deformed at all, and thus human eyes can obtain an optimum viewing experience. In this case, the second sub display screen 12 has 640 pixels in the transverse direction and 1080 pixels in the longitudinal direction; that is, $(M+M_1):N=(1920+640):1080=21:9$.

It can be known from the foregoing descriptions that, the first sub display screen 11 and the second sub display screen 12 are adjoined with the main display screen 10, respectively. In order to facilitate adjoining the first sub display screen 11 with the main display screen 10 and adjoining the second sub display screen 12 with the main display screen 10, for example, the main display screen 10 includes a main frame 103, the first sub display screen 11 includes a first sub frame 113 and the second sub display screen 12 includes a second sub frame 123.

For example, first protrusions 1031 and/or first grooves 1032 are arranged on a side of the main frame 103 facing the first sub frame 113, and second grooves 1131 and/or second protrusions 1132 corresponding to the first protrusions 1031 and/or the first grooves 1032 are arranged on a side of the first sub frame 113 facing the main frame 103.

For example, first protrusions 1031 and/or first grooves 1032 are arranged on a side of the main frame 103 facing the second sub frame 123, and second grooves 1131 and/or second protrusions 1132 corresponding to the first protrusions 1031 and/or the first grooves 1032 are arranged on a side of the second sub frame 123 facing the main frame 103.

Here, the adjoining of the first sub display screen 11 and the main display screen 10 is described as an example. For example, the first sub display screen 11 and the main display screen 10 are adjoined by three structures as follows.

Figure 2A:
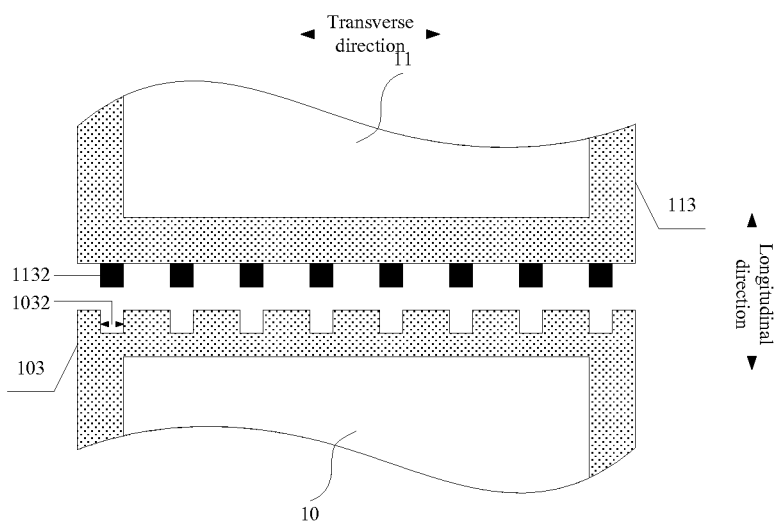
FIG. 2(a) is a schematic view I illustrating adjoining a main display screen and a first sub display screen of the display device according to the embodiments of the disclosure.

As shown in FIG. 2(a), the first grooves 1032 are arranged on the main frame 103 of the main display screen 10, and correspondingly, the second protrusions 1132 are arranged on the first sub frame 113 of the first sub display screen 11; the first sub display screen 11 and the main display screen 10 are adjoined in a manner of inserting the second protrusions 1132 into the first grooves 1032.

Figure 2B:
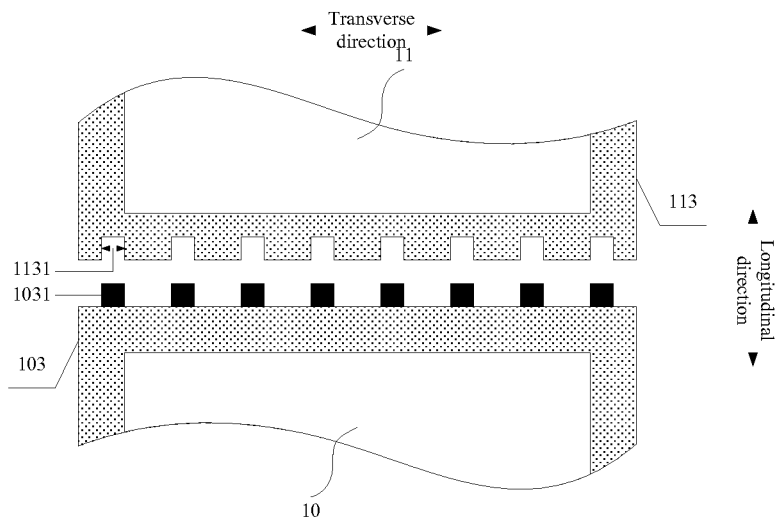
FIG. 2(b) is a schematic view II illustrating adjoining the main display screen and the first sub display screen of the display device according to the embodiments of the disclosure.

As shown in FIG. 2(b), the first protrusions 1031 are arranged on the main frame 103 of the main display screen 10, and correspondingly, the second grooves 1131 are arranged on the first sub frame 113 of the first sub display screen 11; the first sub display screen 11 and the main display screen 10 are adjoined in a manner of inserting the first protrusions 1031 into the second grooves 1131.

Figure 2C:
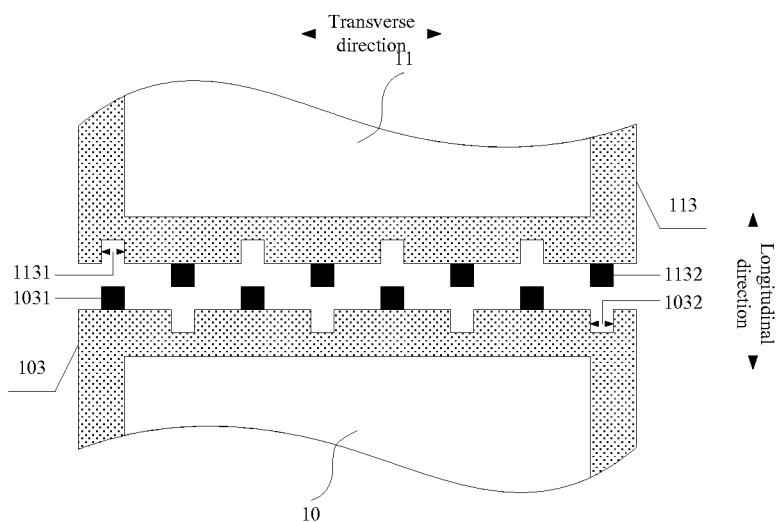
FIG. 2(c) is a schematic view III illustrating adjoining the main display screen and the first sub display screen of the display device according to the embodiments of the disclosure.

As shown in FIG. 2(c), the first protrusions 1031 and the first grooves 1032 are arranged at intervals on the main frame 103 of the main display screen 10, and correspondingly, the second grooves 1131 and the second protrusions 1132 are arranged at intervals on the first sub frame 113 of the first sub display screen 11; the first sub display screen 11 and the main display screen 10 are adjoined in a manner of inserting the first protrusions 1031 into the second grooves 1131 and inserting the second protrusions 1132 into the first grooves 1032.

Similarly, the second sub display screen 12 and the main display screen 10 are adjoined by the above three structures, which will not be repeated here.

For example, in the case that the aspect ratio of the input source image signal is less than the main display scale, the source image signal is displayed in the manner of the main display screen 10+the first sub display screen 11, and the second sub display screen 12 is separated from the main display screen 10; in the case that the aspect ratio of the input source image signal is greater than the main display scale, the second sub display screen 12 is adjoined with the main display screen 10 again to display the source image signal in the manner of the main display screen 10+the second sub display screen 12. In this way, the display device 01 according to the embodiments of the disclosure has more flexible operability.

For example, the first sub display screen 11 and the second sub display screen 12 are adjoined with the main display screen 10 in the manners as follows.

The display device 01 further comprises a connecting piece 26 for connecting the main display screen 10 and the first sub display screen 11 or the second sub display screen 12.

For example, the connecting piece 26 includes a first part 261 fixed with the main display screen 10, a second part 262 fixed with the first sub display screen 11 or the second sub display screen 12; and the first part 261 and the second part 262 are rotatably connected to each other.

For example, the connecting piece 26 is a hinge or any other members for rotatably connecting the main display screen 10 and the first sub display screen 11 or the second sub display screen 12.

Figure 3:
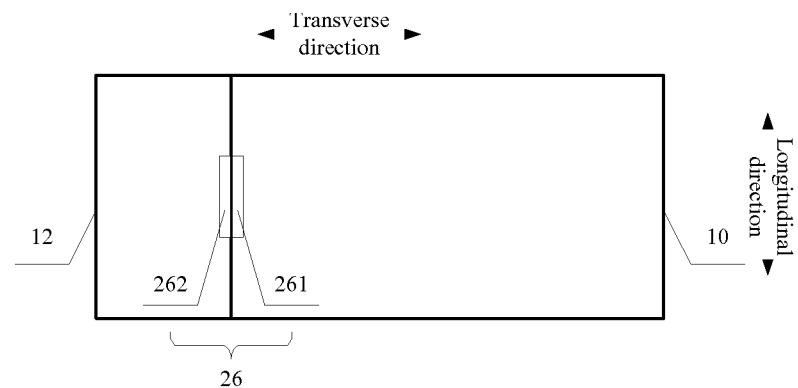
FIG. 3 is a schematic view illustrating adjoining the main display screen and a second sub display screen of the display device according to the embodiments of the disclosure.

As shown in FIG. 3, the adjoining of the second sub display screen 12 and the main display screen 10 is illustrated as an example. The connecting piece 26 is provide so that the second sub display screen 12 is rotatable with respect to the main display screen 10; thus, in the case that the aspect ratio of the input source image signal is less than the main display scale, that is, the second sub display screen 12 is not needed for displaying, the second sub display screen 12 is rotated to a non-display side of the main display screen 10. So, the display device 01 according to the embodiments of the disclosure has more flexible operability.

Figure 4:
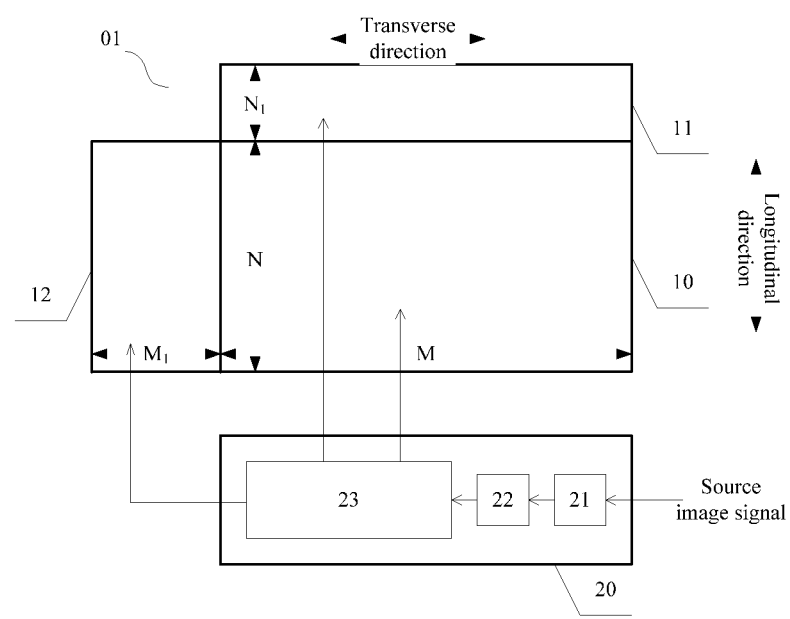
FIG. 4 is a structural schematic view I illustrating a display system according to the embodiments of the disclosure.

Further, the embodiments of the present disclosure provide a display system 01. As shown in FIG. 4, the display system 01 comprises a main display module 10, and a ratio of a number of pixels in a transverse direction to a number of pixels in a longitudinal direction of the main display module 10 is a main display scale. The display system 01 further comprises: a first sub display module 11 and/or a second sub display module 12; the first sub display module 11 and the main display module 10 have the same number of pixels in the transverse direction, and the second sub display module 12 and the main display module 10 have the same number of pixels in the longitudinal direction.

The display system 01 further comprises: a system module 20; and the system module includes a signal receiving module 21, an image judging module 22, and an image processing module 23.

The signal receiving module 21 is configured for receiving an input source image signal; the image judging module 22 is configured for judging an aspect ratio of the source image signal and sending a judgment result to the image processing module 23; and the image processing module 23 is configured for sending a display information according to the judgment result.

In the case that the aspect ratio of the source image signal is equal to the main display scale, the image processing module 23 sends the display information so that a display image matching the number of pixels of the main display module 10 in the transverse direction and the longitudinal direction is provided to the main display module 10 and is displayed by the main display module 10.

In the case that the aspect ratio of the source image signal is less than the main display scale, the image processing module 23 sends the display information so that a first display image matching the number of pixels of the main display module 10 in the transverse direction and the longitudinal direction is provided to the main display module 10, a second display image matching the number of pixels of the first sub display module 11 in the transverse direction and the longitudinal direction is provided to the first sub display module 11, and the main display module 10 and the first sub display module 11 display the first display image and the second display image, respectively.

In the case that the aspect ratio of the source image signal is greater than the main display scale, the image processing module 23 sends the display information so that the first display image matching the number of pixels of the main display module 10 in the transverse direction and the longitudinal direction is provided to the main display module 10, the second display image matching the number of pixels of the second sub display module 12 in the transverse direction and the longitudinal direction is provided to the second sub display module 12, and the main display module 10 and the second sub display module 12 display the first display image and the second display image, respectively.

It should be noted that, the main display module 10, the first sub display module 11 and the second sub display module 12 may be realized by hardware structures, such as a display screen, a display panel and so on.

It should be noted that, respective arrows in FIG. 4 just schematically reflect that the signal receiving module 21 receives the input source image signal, the image processing module 23 provides the display image or the first display image to the main display module 10, the image processing module 23 provides the second display image to the first sub display module 11 or the second sub display module 12, and respective arrows in FIG. 4 do not limit the wiring relationships between components of the display module 01.

It should be noted that, specific arrangement of the system module 20 is not limited by the embodiments of the disclosure; for example, the system module 20 may be arranged in the main display module 10, and connected with the first sub display module 11 and/or the second sub display module 12 through wires; or, the system module 20 may be arranged in a digital video converter box (i.e., known as a set-top box) so that it is independent from the main display module 10, the first sub display module 11 and/or the second sub display module 12 and is connected with the main display module 10, the first sub display module 11 and/or the second sub display module 12 through corresponding wires.

Based on the above descriptions, in the display system 01 according to the embodiments of the present disclosure, in one aspect, in the case that the aspect ratio of the input source image signal is equal to the main display scale, the display image without deformation is provided to the main display module 10 by the system module 20 and is displayed by the main display module 10.

In another aspect, in the case that the aspect ratio of the input source image signal is not equal to the main display scale, since the first sub display module 11 and the main display module 10 have the same number of pixels in the transverse direction and the second sub display module 12 and the main display module 10 have the same number of pixels in the longitudinal direction, which is equivalent to enlarging an effective display region of the display module in the longitudinal direction and the transverse direction as compared with the single display module in the prior art, the source image signal is displayed in full screen in the manner of the main display module 10+the first sub display module 11 or the main display module 10+the second sub display module 12. So, a deformation amount of the source image signal in the longitudinal direction and/or the transverse direction can be reduced or avoided, and thus a full screen display image with better viewing experience is provided to people.

In addition, the first sub display module 11 and the second sub display module 12 are provided, which is equivalent to increasing the effective display region in two directions compared with the single display module in the prior art; accordingly, no matter in the case that the aspect ratio of the input source image signal is less than the main display scale or in the case that the aspect ratio of the input source image signal is greater than the main display scale, the display system 01 according to the embodiments of the present disclosure displays the source image signal in full module with little deformation in the manner of the main display module 10+the first sub display module 11 or the main display module 10+the second sub display module 12 matching the aspect ratio of the input source image signal, so that the display system 01 according to the embodiments of the present disclosure has higher market value, higher availability, and stronger operability.

Figure 5:
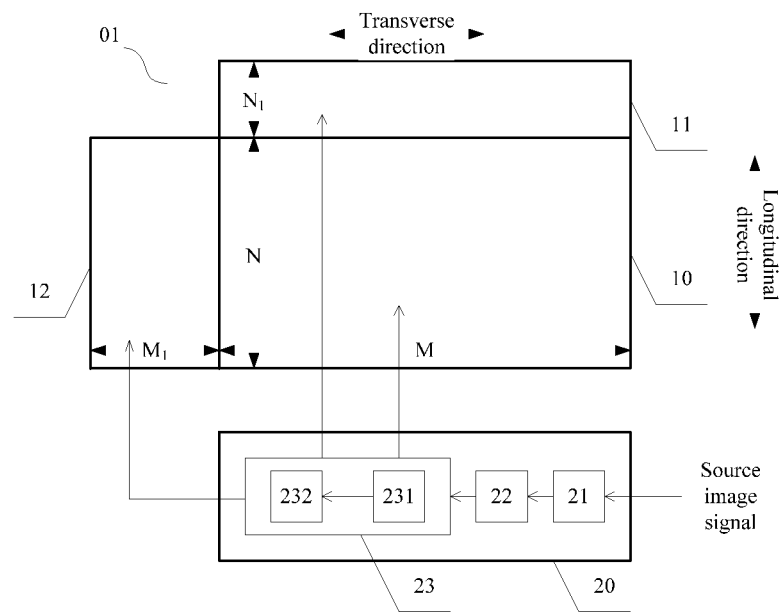
FIG. 5 is a structural schematic view II illustrating the display system according to the embodiments of the disclosure.

Based on the above descriptions, as shown in FIG. 5, the image processing module 23 for example includes an image converting sub-module 231 and an image segmenting sub-module 232.

For example, the image converting sub-module 231 is configured as follows.

In the case that the aspect ratio of the source image signal is equal to the main display scale, and in the case that the resolution of the source image signal is less than/greater than the number of pixels of the main display module 10 in the transverse direction and the resolution of the source image signal is less than/greater than the number of pixels of the main display module 10 in the longitudinal direction, the image converting sub-module 231 stretches/compresses the source image signal according to the aspect ratio of the source image signal (that is, the aspect ratio of the source image signal is not changed) so as to match the number of pixels of the main display module 10 in the transverse direction and the longitudinal direction.

In the case that the aspect ratio of the source image signal is less than the main display scale, and in the case that the resolution of the source image signal is less than/greater than the number of pixels of the main display module 10 in the transverse direction and the resolution of the source image signal is less than/greater than a sum of the number of pixels of the main display module 10 and the number of pixels of the first sub display module 11 in the longitudinal direction, the image converting sub-module 231 stretches/compresses the source image signal according to the aspect ratio of the source image signal (that is, the aspect ratio of the source image signal is not changed) so as to match the number of pixels of the main display module 10 in the transverse direction, and match the sum of the number of pixels of the main display module 10 and the number of pixels of the first sub display module 11 in the longitudinal direction.

In the case that the aspect ratio of the source image signal is greater than the main display scale, and in the case that the resolution of the source image signal is less than/greater than a sum of the number of pixels of the main display module 10 and the number of pixels of the second sub display module 12 in the transverse direction and the resolution of the source image signal is less than/greater than the number of pixels of the main display module 10 in the longitudinal direction, the image converting sub-module 231 stretches/compresses the source image signal according to the aspect ratio of the source image signal (that is, the aspect ratio of the source image signal is not changed) so as to match the sum of the number of pixels of the main display module 10 and the number of pixels of the second sub display module 12 in the transverse direction, and match the number of pixels of the main display module 10 in the longitudinal direction.

The image segmenting sub-module 232 is configured for: in the case that the aspect ratio of the source image signal is not equal to the main display scale, segmenting the stretched/compressed source image signal to the first display image and the second display image.

Hereinafter, an example that the aspect ratio of the input source image signal is less than the main display scale is described. In the case that the aspect ratio of the input source image signal is less than the main display scale, the input source image signal has X pixels in the transverse direction (marked as X here and hereinafter) and Y pixels in the longitudinal direction (marked as Y here and hereinafter), and a resolution thereof is X×Y. In the case that X≠M and Y≠(N+N$_1$), in order to display the input source image signal in full screen in the manner of the main display screen 10+the first sub display screen 11, the resolution of the source image signal needs to be converted. Since such resolution conversion is performed at equal ratio along the transverse direction and the longitudinal direction, the aspect ratio of the input source image signal does not change after the resolution of the input source image signal is converted.

In addition, the embodiments of the present disclosure provide an example; in this example, for example, the aspect ratio of the input source image signal is 4:3, the number of pixels of the main display module 10 in the transverse direction is 1920 and the number of pixels of the main display module 10 in the longitudinal direction is 1080 (i.e., the main display scale of the main display module is 1920:1080=16:9), and meanwhile, the number of pixels of the first sub display module 11 in the transverse direction is 1920 and the number of pixels of the first sub display module 11 in the longitudinal direction is 360.

In the case that the resolutions of the input source image signal having the aspect ratio of 4:3 in the transverse direction and in the longitudinal direction satisfy X<M and Y<(N+N$_1$), by using the image converting sub-module 231, the input source image signal is stretched so that X is stretched to M, i.e., 1920, and Y is stretched to (N+N$_1$), i.e., 1440; then, by using the image segmenting sub-module 232, the stretched source image signal is segmented so that an image having a resolution of X$_1$×Y$_1$=1920×1080 (i.e., the first display image) is provided to the main display module 10, and an image having a resolution of X$_2$×Y$_2$=1920×360 (i.e., the second display image) is provided to the first sub display module 11.

Thus, the first display image matching the number of pixels of the main display module 10 in the transverse direction and the longitudinal direction is provided to the main display module 10, and the second display image matching the number of pixels of the first sub display module 11 in the transverse direction and the longitudinal direction is provided to the first sub display module 11.

Figure 6:
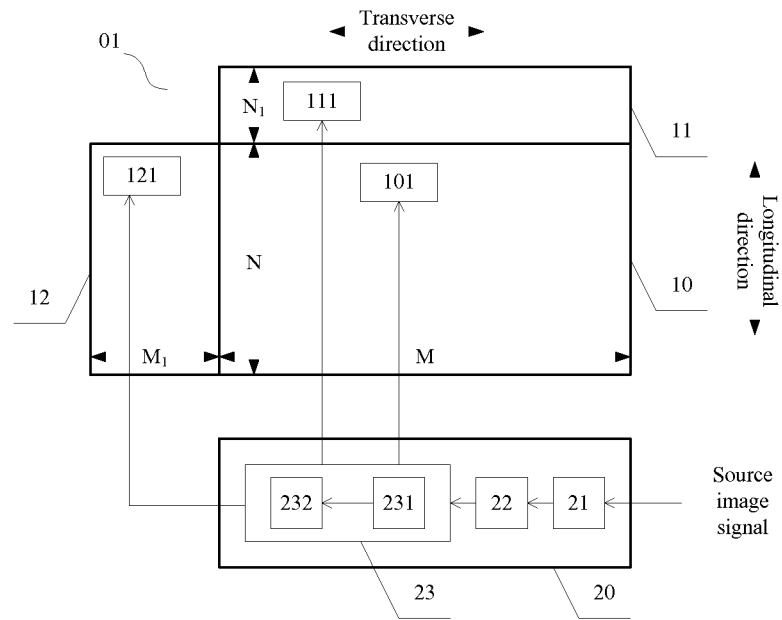
FIG. 6 is a structural schematic view III illustrating the display system according to the embodiments of the disclosure.

Based on the above descriptions, as shown in FIG. 6, the main display module 10, the first sub display module 11 and the second sub display module 12 respectively include a main time sequence controller 101, a first sub time sequence controller 111 and a second sub time sequence controller 121, which are connected with the image processing module 23.

For example, the main time sequence controller 101 is configured for receiving the display image or the first display image; and the first sub time sequence controller 111 or the second sub time sequence controller 121 is configured for receiving the second display image.

It should be noted that, FIG. 6 just schematically illustrates that the main time sequence controller 101 receives the display image or the first display image provided by the image processing module 23, and the first sub time sequence controller 111 or the second sub time sequence controller 121 receives the second display image provided by the image processing module 23.

It should be noted that, position of the main time sequence controller 101 in the main display module 10, position of the first sub time sequence controller 111 in the first sub display module 11 and position of the second sub time sequence controller 121 in the second sub display module 12 are not limited, and wiring manners of connecting respective time sequence controllers with the image processing module 23 are not limited as well.

Figure 7:
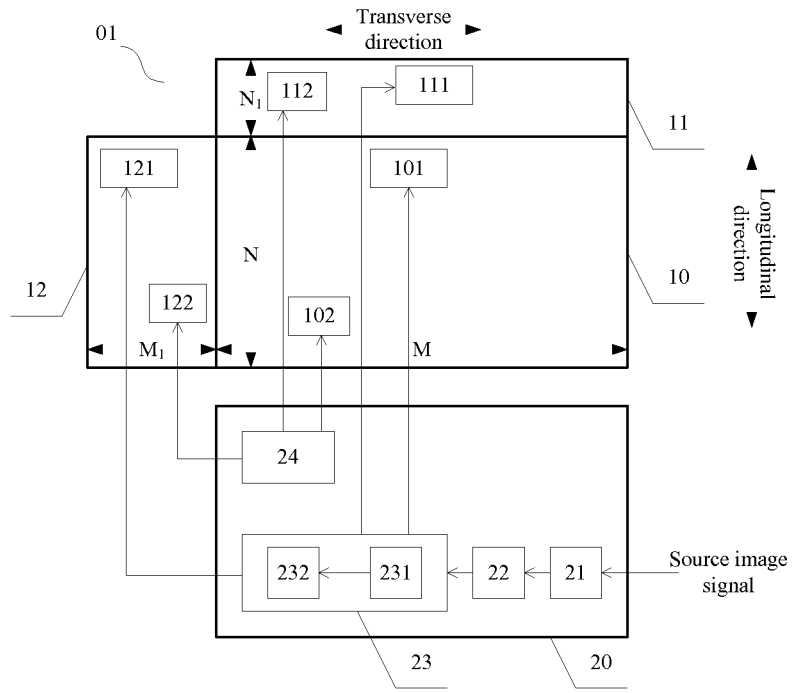
FIG. 7 is a structural schematic view IV illustrating the display system according to the embodiments of the disclosure.

Further, in the case that the main display module 10, the first sub display module 11, and the second sub display module 12 are realized by hardware structures, for example, a display screen of a passive light-emitting type, such as a Liquid Crystal Display (LCD), as shown in FIG. 7, the system module 20 further includes a backlight driving module 24.

Accordingly, the main display module 10, the first sub display module 11, and the second sub display module 12 include a main backlight module 102, a first sub backlight module 112, a second sub backlight module 122, which are connected with the backlight driving module 24, respectively.

It should be noted that, FIG. 7 just schematically illustrates that the main backlight module 102, the first sub backlight module 112, and the second sub backlight module 122 are driven by the backlight driving module 24, respectively, but does not represent actual sizes and positions of respective backlight modules.

Figure 8:
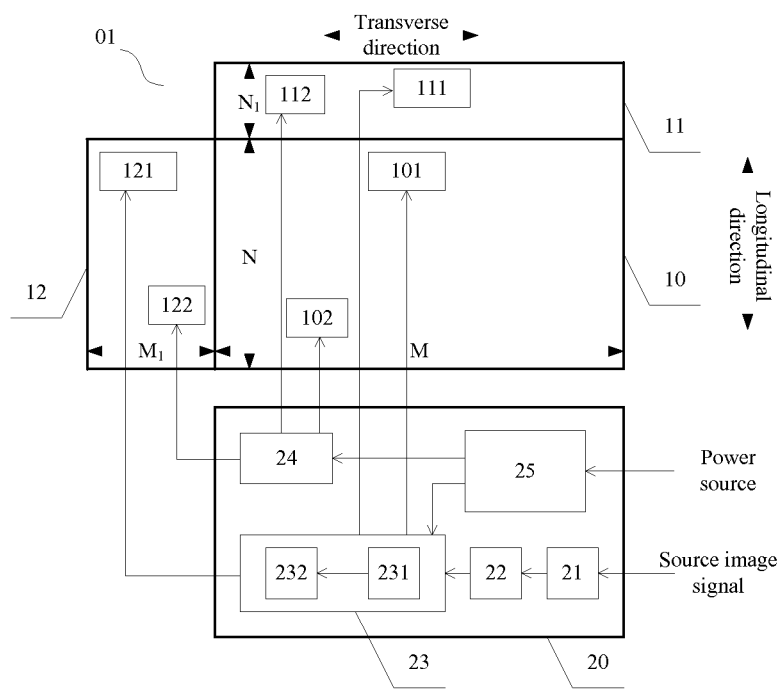
FIG. 8 is a structural schematic view V illustrating the display system according to the embodiments of the disclosure.

Here, as shown in FIG. 8, the system module 20 for example further includes a power module 25, for receiving power and supplying power to the backlight driving module 24 and the image processing module 23, respectively.

Figure 9:
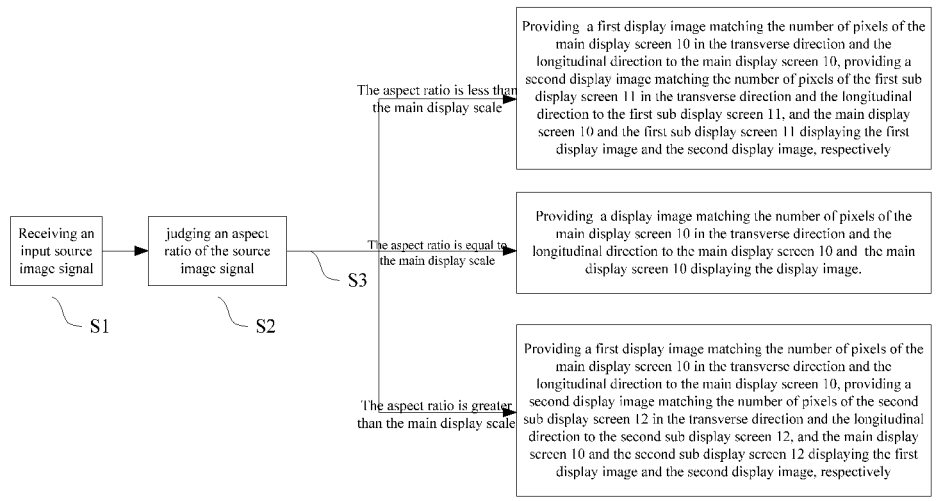
FIG. 9 is a schematic view illustrating a display method of a display device according to the embodiments of the present disclosure.

Further, the embodiments of the present disclosure further provide a display method of the display device 01. For example, as shown in FIG. 9, the method comprises:

S1: receiving an input source image signal.

S2: judging an aspect ratio of the source image signal.

S3: sending display information to the display device 01 according to a judgment result of step S2.

In the case that the aspect ratio of the source image signal is equal to the main display scale, the display information is sent so that a display image matching the number of pixels of the main display screen 10 in the transverse direction and the longitudinal direction is provided to the main display screen 10 and is displayed by the main display screen 10.

In the case that the aspect ratio of the source image signal is less than the main display scale, the display information is sent so that a first display image matching the number of pixels of the main display screen 10 in the transverse direction and the longitudinal direction is provided to the main display screen 10, a second display image matching the number of pixels of the first sub display screen 11 in the transverse direction and the longitudinal direction is provided to the first sub display screen 11, and the main display screen 10 and the first sub display screen 11 display the first display image and the second display image, respectively.

In the case that the aspect ratio of the source image signal is greater than the main display scale, the display information is sent so that a first display image matching the number of pixels of the main display screen 10 in the transverse direction and the longitudinal direction is provided to the main display screen 10, a second display image matching the number of pixels of the second sub display screen 12 in the transverse direction and the longitudinal direction is provided to the second sub display screen 12, and the main display screen 10 and the second sub display screen 12 display the first display image and the second display image, respectively.

It can be known from the above descriptions that, for different relationships between the aspect ratio of the input source image signal and the main display scale of the main display screen 10, step S3 includes three available display modes as follows:

Mode I: in the case that the aspect ratio of the source image signal is equal to the main display scale, the main display screen 10 displays the input source image signal.

Mode II: in the case that the aspect ratio of the source image signal is less than the main display scale, the main display screen 10 and the first sub display screen 11 jointly display the input source image signal.

Mode III: in the case that the aspect ratio of the source image signal is greater than the main display scale, the main display screen 10 and the second sub display screen 12 jointly display the image of the input source image signal.

Figure 10A:
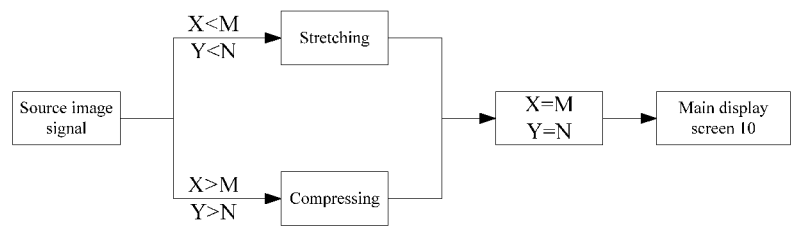
FIG. 10(*a*) is a schematic view illustrating Mode I in step S3 of the display method of the display device according to the embodiments of the present disclosure.

Further, for the above Mode I, as shown in FIG. 10(a), in the case that the aspect ratio of the input source image signal is equal to the main display scale, and in the case that the resolution X of the source image signal in the transverse direction is less than/greater than the number of the pixels M of the main display screen 10 in the transverse direction and the resolution Y of the source image signal in the longitudinal direction is less than/greater than the number of the pixels N of the main display screen 10 in the longitudinal direction: the source image signal is stretched/compressed to match the number of pixels of the main display screen in the transverse direction and the longitudinal direction according to the aspect ratio of the source image signal.

Figure 10B:
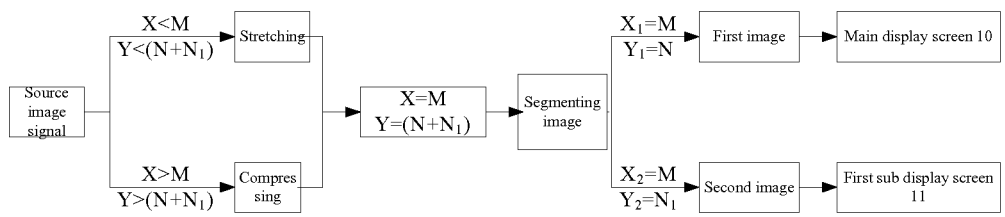

For the above Mode II, as shown in FIG. 10(b), in the case that the aspect ratio of the source image signal is less than the main display scale, and in the case that the resolution X of the source image signal in the transverse direction is less than/greater than the number of pixels M of the main display screen 10 in the transverse direction and the resolution Y of the source image signal in the longitudinal direction is less than/greater than a sum of the number of pixels N of the main display screen 10 in the longitudinal direction and the number of pixels $N_1$ of the first sub display screen 11 in the longitudinal direction: the source image signal is stretched/compressed to match the number of pixels of the main display screen 10 in the transverse direction and match the sum of the number of pixels of the main display screen 10 and the number of pixels of the first sub display screen 11 in the longitudinal direction according to the aspect ratio of the source image signal. Then, the stretched/compressed source image signal is segmented into the first display image (a resolution thereof is marked as $X_1 \times Y_1$) and the second display image (a resolution thereof is marked as $X_2 \times Y_2$).

Figure 10C:
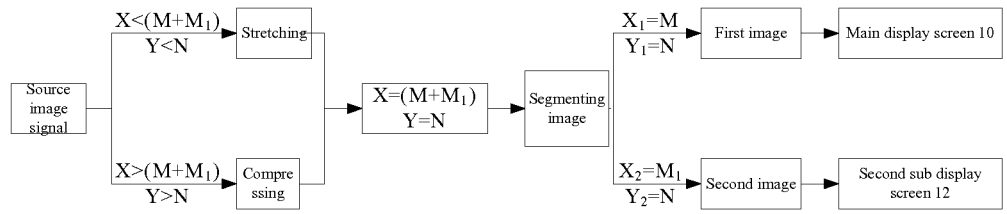

For the above Mode III, as shown in FIG. 10(c), in the case that the aspect ratio of the source image signal is greater than the main display scale, and in the case that the resolution X of the source image signal in the transverse direction is less than/greater than a sum of the number of pixels M of the main display screen 10 in the transverse direction and the number of pixels $M_1$ of the second sub display screen 12 in the transverse direction and the resolution Y of the source image signal in the longitudinal direction is less than/greater than the number of pixels N of the main display screen 10 in the longitudinal direction: the source image signal is stretched/compressed to match the sum of the number of pixels of the main display screen 10 and the number of pixels $M_1$ of the second sub display screen 12 in the transverse direction and match the number of pixels of the main display screen in the longitudinal direction according to the aspect ratio of the source image signal. Then, the stretched/compressed source image signal is segmented to the first display image (a resolution thereof is marked as $X_1 \times Y_1$) and the second display image (a resolution thereof is marked as $X_2 \times Y_2$).

In addition, considering that a visual field of human two eyes is a rectangle with an aspect ratio close to 16:9, for example, the main display screen 10 has 1920 pixels in the transverse direction and 1080 pixels in the longitudinal direction. That is, the main display scale is 1920:1080=16:9.

In addition, the aspect ratio of the source image signal less than 16:9 and commonly used in current display industry is 4:3. Based on the foregoing descriptions, in the case that the aspect ratio of the input source image signal is less than the main display scale of the main display screen 10, the ratio of $M:(N+N_1)$ is set to be equal to the aspect ratio of the input source image signal, so that the source image signal is displayed in full screen in the manner of the main display screen 10+the first sub display screen and is not deformed at all, and thus human eyes can obtain an optimum viewing experience. In this case, the first sub display screen 11 has 1920 pixels in the transverse direction and 360 pixels in the longitudinal direction; that is, $M:(N+N_1)=1920:(1080+360)=4:3$.

Similarly, the aspect ratio of the source image signal greater than 16:9 and commonly used in current display industry is 21:9. Based on the foregoing descriptions, in the case that the aspect ratio of the input source image signal is greater than the main display scale of the main display screen 10, the ratio of $(M+M_1):N$ is set to be equal to the aspect ratio of the input source image signal, so that the source image signal is displayed in full screen in the manner of the main display screen 10+the second sub display screen and is not deformed at all, and thus human eyes can obtain an optimum viewing experience. In this case, the second sub display screen 12 has 640 pixels in the transverse direction and 1080 pixels in the longitudinal direction; that is, $(M+M_1):N=(1920+640):1080=21:9$.

Figure 11A:
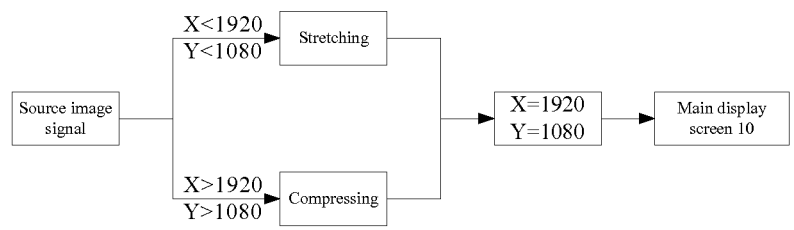
FIG. 11(*a*) is an example of the Mode I shown in FIG. 10(*a*)

For example, an example of the above Mode I is shown in FIG. 11(a). In the case that the aspect ratio of the source image signal is 16:9, and in the case that the resolution of the source image signal in the transverse direction is less than/greater than 1920 and the resolution of the source image signal in the longitudinal direction is less than/greater than 1080, the source image signal is stretched/compressed to 1920 pixels in the transverse direction and to 1080 pixels in the longitudinal direction according to the aspect ratio of the source image signal.

Figure 11B:
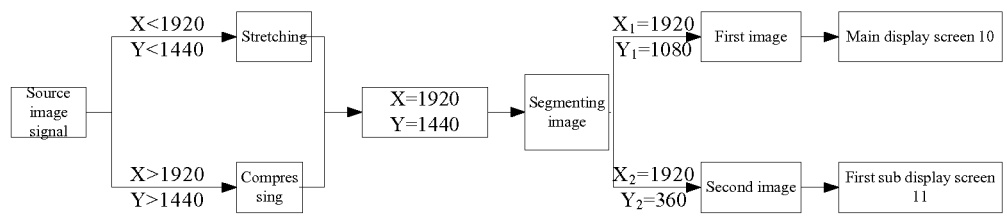

For example, an example of the above Mode II is shown in FIG. 11(b). In the case that the aspect ratio of the source image signal is 4:3, and in the case that the resolution of the source image signal in the transverse direction is less than/greater than 1920 and the resolution of the source image signal in the longitudinal direction is less than/greater than 1440, the source image signal is stretched/compressed to 1920 pixels in the transverse direction and 1440 pixels in the longitudinal direction according to the aspect ratio of the source image signal. Then, the stretched/compressed source image signal is segmented into the first display image and the second display image. The first display image has 1920 pixels in the transverse direction and 1080 pixels in the longitudinal direction; the second display image has 1920 pixels in the transverse direction and 360 pixels in the longitudinal direction.

Figure 11C:
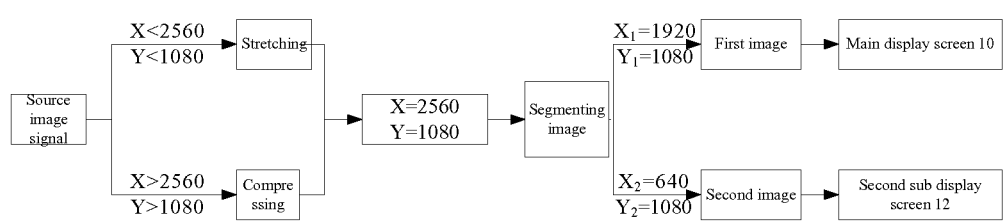

For example, an example of the above Mode III is shown in FIG. 11(c). In the case that the aspect ratio of the source image signal is 21:9, and in the case that the resolution of the source image signal in the transverse direction is less than/greater than 2560 and the resolution of the source image signal in the longitudinal direction is less than/greater than 1080, the source image signal is stretched/compressed to 2560 pixels in the transverse direction and 1080 pixels in the longitudinal direction according to the aspect ratio of the source image signal. Then, the stretched/compressed source image signal is segmented into the first display image and the second display image. The first display image has 1920 pixels in the transverse direction and 1080 pixels in the longitudinal direction; the second display image has 640 pixels in the transverse direction and 1080 pixels in the longitudinal direction.

Herein, in the case that the aspect ratio of the input source image signal is not equal to any one of 16:9, 4:3 and 21:9, the display device 01 for example displays the input source image signal as follows:

For example, in the case that the aspect ratio of the source image signal is close to 16:9 (slightly greater than or slightly less than), with reference to the above Mode I, the resolution of the source image signal is stretched/compressed to 1920 pixels in the transverse direction and to 1080 pixels in the longitudinal direction according to the aspect ratio of the source image signal. Because the aspect ratio of the source image signal is slightly greater than or slightly less than 16:9, the image displayed by the main display screen 10 is slightly deformed in the transverse direction or the longitudinal direction.

In the case that the aspect ratio of the source image signal is close to 4:3 (slightly greater than or slightly less than), with reference to the above Mode II, the resolution of the source image signal is stretched/compressed to 1920 pixels in the transverse direction and 1440 pixels in the longitudinal direction according to the aspect ratio of the source image signal. Because the aspect ratio of the source image signal is slightly greater than or slightly less than 4:3, the image jointly displayed by the main display screen 10+the first sub display screen 11 is slightly deformed in the transverse direction or the longitudinal direction.

In the case that the aspect ratio of the source image signal is close to 21:9 (slightly greater than or slightly less than), with reference to the above Mode III, the resolution of the source image signal is stretched/compressed to 2560 pixels in the transverse direction and 1080 pixels in the longitudinal direction according to the aspect ratio of the source image signal. Because the aspect ratio of the source image signal is slightly greater than or slightly less than 21:9, the image jointly displayed by the main display screen 10+the second sub display screen 12 is slightly deformed in the transverse direction or the longitudinal direction.

In this way, even in the case that the aspect ratio of the source image signal input to the display device 01 is not equal to any one of 16:9, 4:3 and 21:9, by combination of the main display screen 1 and the first sub display screen 11/the second sub display screen 12, the image displayed in full screen will be slightly deformed, and flexibility of the display device 01 is further improved, which can be more flexibly applicable to diversified development in display field in future, and have wider application prospect in the market.

It should be noted that, all the drawings of the disclosure are schematic diagrams of the display device, the display system and the display method, and are just to clearly describe that the present solution reflects structures related with the inventive points; and other structures unrelated with the disclosure are not or only partially reflected in the drawings.

The foregoing embodiments merely are exemplary embodiments of the disclosure, and not intended to define the scope of the disclosure, and the scope of the disclosure is determined by the appended claims.

The present application claims priority of Chinese Patent Application No. 201410403639.4 filed on Aug. 15, 2015, the disclosure of which is incorporated herein by reference in its entirety as part of the present application.

The invention claimed is:

1. A display device, comprising a main display screen, a ratio of a number of pixels in a transverse direction to a number of pixels in a longitudinal direction of the main display screen being a main display scale, wherein
the display device further comprises: a first sub display screen adjoined with the main display screen in the longitudinal direction, and the first sub display screen and the main display screen having the same number of pixels in the transverse direction; and/or, a second sub display screen adjoined with the main display screen in the transverse direction, and the second sub display screen and the main display screen having the same number of pixels in the longitudinal direction;
in the case that an aspect ratio of a source image signal input to the display device is equal to the main display scale, the main display screen displays a display image matching the number of pixels of the main display screen in the transverse direction and the longitudinal direction;
in the case that the aspect ratio of the source image signal input to the display device is less than the main display scale, the main display screen displays a first display image matching the number of pixels of the main display screen in the transverse direction and the longitudinal direction, and the first sub display screen displays a second display image matching the number of pixels of the first sub display screen in the transverse direction and the longitudinal direction; and
in the case that the aspect ratio of the source image signal input to the display device is greater than the main display scale, the main display screen displays the first display image matching the number of pixels of the main display screen in the transverse direction and the longitudinal direction, and the second sub display screen displays the second display image matching the number of pixels of the second sub display screen in the transverse direction and the longitudinal direction.

2. The display device according to claim 1, wherein,
the main display screen has 1920 pixels in the transverse direction and 1080 pixels in the longitudinal direction;
the first sub display screen has 1920 pixels in the transverse direction and 360 pixels in the longitudinal direction; and
the second sub display screen has 640 pixels in the transverse direction and 1080 pixels in the longitudinal direction.

3. The display device according to claim 2, wherein,
the main display screen includes a main frame, the first sub display screen includes a first sub frame, and the second sub display screen includes a second sub frame;
first protrusions and/or first grooves are arranged on a side of the main frame facing the first sub frame, second grooves and/or second protrusions corresponding to the first protrusions and/or the first grooves are arranged on a side of the first sub frame facing the main frame; and
the first protrusions and/or the first grooves are arranged on a side of the main frame facing the second sub frame, the second grooves and/or the second protrusions corresponding to the first protrusions and/or the first grooves are arranged on a side of the second sub frame facing the main frame.

4. The display device according to claim 2, further comprising: a connecting piece for connecting the main display screen and the first sub display screen or the second sub display screen, wherein
the connecting piece includes a first part fixed with the main display screen, and a second part fixed with the first sub display screen or the second sub display screen, and
wherein the first part and the second part are rotatably connected to each other.

5. The display device according to claim 1, wherein,
the main display screen includes a main frame, the first sub display screen includes a first sub frame, and the second sub display screen includes a second sub frame;
first protrusions and/or first grooves are arranged on a side of the main frame facing the first sub frame, second grooves and/or second protrusions corresponding to the first protrusions and/or the first grooves are arranged on a side of the first sub frame facing the main frame; and the first protrusions and/or the first grooves are arranged on a side of the main frame facing the second sub frame, the second grooves and/or the second protrusions corresponding to the first protrusions and/or the first grooves are arranged on a side of the second sub frame facing the main frame.

6. The display device according to claim 1, further comprising: a connecting piece for connecting the main display screen and the first sub display screen or the second sub display screen;

the connecting piece includes a first part fixed with the main display screen, and a second part fixed with the first sub display screen or the second sub display screen; and the first part and the second part are rotatably connected to each other.

7. A display method for driving the display device according to claim 1 to display, comprising:

receiving an input source image signal;

judging an aspect ratio of the source image signal; and sending display information to the display device according to a judgment result, wherein in the case that the aspect ratio of the source image signal is equal to the main display scale, the display information is sent so that the display image matching the number of pixels of the main display screen in the transverse direction and the longitudinal direction is provided to the main display screen and is displayed by the main display screen;

in the case that the aspect ratio of the source image signal is less than the main display scale, the display information is sent so that the first display image matching the number of pixels of the main display screen in the transverse direction and the longitudinal direction is provided to the main display screen, the second display image matching the number of pixels of the first sub display screen in the transverse direction and the longitudinal direction is provided to the first sub display screen, and the main display screen and the first sub display screen display the first display image and the second display image, respectively; and in the case that the aspect ratio of the source image signal is greater than the main display scale, the display information is sent so that the first display image matching the number of pixels of the main display screen in the transverse direction and the longitudinal direction is provided to the main display screen, the second display image matching the number of pixels of the second sub display screen in the transverse direction and the longitudinal direction is provided to the second sub display screen, and the main display screen and the second sub display screen display the first display image and the second display image, respectively.

8. The display method according to claim 7, wherein, in the case that the aspect ratio of the source image signal is equal to the main display scale, and in the case that a resolution of the source image signal in the transverse direction is less than/greater than the number of the pixels of the main display screen in the transverse direction and a resolution of the source image signal in the longitudinal direction is less than/greater than the number of the pixels of the main display screen in the longitudinal direction: the source image signal is stretched/compressed to match the number of pixels of the main display screen in the transverse direction and the longitudinal direction according to the aspect ratio of the source image signal;

in the case that the aspect ratio of the source image signal is less than the main display scale, and in the case that the resolution of the source image signal in the transverse direction is less than/greater than the number of pixels of the main display screen in the transverse direction and the resolution of the source image signal in the longitudinal direction is less than/greater than a sum of the number of pixels of the main display screen in the longitudinal direction and the number of pixels of the first sub display screen in the longitudinal direction: the source image signal is stretched/compressed to match the number of pixels of the main display screen in the transverse direction and match the sum of the number of pixels of the main display screen and the number of pixels of the first sub display screen in the longitudinal direction according to the aspect ratio of the source image signal; and then, the stretched/compressed source image signal is segmented into the first display image and the second display image; and in the case that the aspect ratio of the source image signal is greater than the main display scale, and in the case that the resolution of the source image signal in the transverse direction is less than/greater than a sum of the number of pixels of the main display screen in the transverse direction and the number of pixels of the second sub display screen in the transverse direction and the resolution of the source image signal in the longitudinal direction is less than/greater than the number of pixels of the main display screen in the longitudinal direction: the source image signal is stretched/compressed to match the sum of the number of pixels of the main display screen and the number of pixels of the second sub display screen in the transverse direction and match the number of pixels of the main display screen in the longitudinal direction according to the aspect ratio of the source image signal; and then, the stretched/compressed source image signal is segmented into the first display image and the second display image.

9. The display method according to claim 8, wherein the main display screen has 1920 pixels in the transverse direction and 1080 pixels in the longitudinal direction, the first sub display screen has 1920 pixels in the transverse direction and 360 pixels in the longitudinal direction, the second sub display screen has 640 pixels in the transverse direction and 1080 pixels in the longitudinal direction;

in the case that the aspect ratio of the source image signal is 16:9, and in the case that the resolution of the source image signal in the transverse direction is less than/greater than 1920 and the resolution of the source image signal in the longitudinal direction is less than/greater than 1080, the source image signal is stretched/compressed to 1920 pixels in the transverse direction and to 1080 pixels in the longitudinal direction according to the aspect ratio of the source image signal;

in the case that the aspect ratio of the source image signal is 4:3, and in the case that the resolution of the source image signal in the transverse direction is less than/greater than 1920 and the resolution of the source image signal in the longitudinal direction is less than/greater than 1440, the source image signal is stretched/compressed to 1920 pixels in the transverse direction and 1440 pixels in the longitudinal direction according to the aspect ratio of the source image signal, then the stretched/compressed source image signal is segmented into the first display image and the second display image, the first display image has 1920 pixels in the transverse direction and 1080 pixels in the longitudinal direction, and the second display image has 1920 pixels in the transverse direction and 360 pixels in the longitudinal direction; and in the case that the aspect ratio of the source image signal is 21:9, and in the case that the resolution of the source image signal in the transverse direction is less than/greater than 2560 and the resolution of the source image signal in the longitudinal direction is less than/greater than 1080, the source image signal is stretched/compressed to 2560 pixels in the transverse direction and 1080 pixels in the longitudinal direction according to the aspect ratio of the source image signal, then the stretched/compressed source image signal is segmented into the first display image and the second display image, the first display image has 1920 pixels in the transverse direction and 1080 pixels in the longitudinal direction, and the second display image has 640 pixels in the transverse direction and 1080 pixels in the longitudinal direction.

10. A display system, comprising a main display screen, a ratio of a number of pixels in a transverse direction to a number of pixels in a longitudinal direction of the main display screen being a main display scale;

wherein the display system further comprises:

a first sub display screen and/or a second sub display screen, the first sub display screen and the main display screen having the same number of pixels in the transverse direction, and the second sub display screen and the main display screen having the same number of pixels in the longitudinal direction; and a system circuit, including a signal receiving circuit, an image judging circuit and an image processing circuit, the signal receiving circuit being configured for receiving an input source image signal, the image judging circuit being configured for judging an aspect ratio of the source image signal and sending a judgment result to the image processing circuit, and the image processing circuit being configured for sending display information according to the judgment result, wherein, in the case that the aspect ratio of the source image signal is equal to the main display scale, a display image matching the number of pixels of the main display screen in the transverse direction and the longitudinal direction is provided to the main display screen and is displayed by the main display screen;

in the case that the aspect ratio of the source image signal is less than the main display scale, a first display image matching the number of pixels of the main display screen in the transverse direction and the longitudinal direction is provided to the main display screen, a second display image matching the number of pixels of the first sub display screen in the transverse direction and the longitudinal direction is provided to the first sub display screen, and the main display screen module and the first sub display screen display the first display image and the second display image, respectively; and in the case that the aspect ratio of the source image signal is greater than the main display scale, the first display image matching the number of pixels of the main display screen in the transverse direction and the longitudinal direction is provided to the main display screen, the second display image matching the number of pixels of the second sub display screen in the transverse direction and the longitudinal direction is provided to the second sub display screen, and the main display screen and the second sub display screen display the first display image and the second display image, respectively.

11. The display system according to claim 10, wherein the image processing circuit includes an image converting sub-circuit and an image segmenting sub-circuit;

in the case that the aspect ratio of the source image signal is equal to the main display scale, and in the case that a resolution of the source image signal is less than/greater than the number of pixels of the main display screen in the transverse direction and the resolution of the source image signal is less than/greater than the number of pixels of the main display screen in the longitudinal direction, the image converting sub-circuit stretches/compresses the source image signal according to the aspect ratio of the source image signal so as to match the number of pixels of the main display screen in the transverse direction and the longitudinal direction;

in the case that the aspect ratio of the source image signal is less than the main display scale, and in the case that the resolution of the source image signal is less than/greater than the number of pixels of the main display screen in the transverse direction and the resolution of the source image signal is less than/greater than a sum of the number of pixels of the main display screen and the number of pixels of the first sub display screen in the longitudinal direction, the image converting sub-circuit stretches/compresses the source image signal according to the aspect ratio of the source image signal so as to match the number of pixels of the main display screen in the transverse direction, and match the sum of the number of pixels of the main display screen and the number of pixels of the first sub display screen in the longitudinal direction;

in the case that the aspect ratio of the source image signal is greater than the main display scale, and in the case that the resolution of the source image signal is less than/greater than a sum of the number of pixels of the main display screen and the number of pixels of the second sub display screen in the transverse direction and the resolution of the source image signal is less than/greater than the number of pixels of the main display screen in the longitudinal direction, the image converting sub-circuit stretches/compresses the source image signal according to the aspect ratio of the source image signal so as to match the sum of the number of pixels of the main display screen and the number of pixels of the second sub display screen in the transverse direction, and match the number of pixels of the main display screen in the longitudinal direction; and the image segmenting sub-circuit is configured for: in the case that the aspect ratio of the source image signal is not equal to the main display scale, segmenting the stretched/compressed source image signal into the first display image and the second display image.

12. The display system according to claim 11, wherein the main display screen includes a main time sequence controller circuit, the first sub display screen includes a first sub time sequence controller circuit, the second sub display screen includes a second sub time sequence controller circuit, and the main time sequence controller circuit, the first sub display screen and the second sub display screen are connected with the image processing circuit; and the main time sequence controller circuit is configured for receiving the display image or the first display image and the first sub time sequence controller circuit or the second sub time sequence controller circuit is configured for receiving the second display image.

13. The display system according to claim 11, wherein the system circuit further includes a backlight driving circuit; and the main display screen includes a main backlight source, the first sub display screen includes a first sub backlight source, the second sub display screen includes a second sub backlight source, and the main backlight source, the first sub backlight module source and the second sub backlight source are connected with the backlight driving circuit.

14. The display system according to claim 10, wherein the main display screen includes a main time sequence controller circuit, the first sub display screen includes a first sub time sequence controller circuit, the second sub display screen includes a second sub time sequence controller circuit, and the main time sequence controller circuit, the first sub display screen and the second sub display screen are connected with the image processing circuit; and the main time sequence controller circuit is configured for receiving the display image or the first display image, and the first sub time sequence controller circuit or the second sub time sequence controller circuit is configured for receiving the second display image.

15. The display system according to claim 10, wherein the system circuit further includes a backlight driving circuit; and the main display screen includes a main backlight source, the first sub display screen includes a first sub backlight source, the second sub display screen includes a second sub backlight source, and the main backlight source, the first sub backlight module source and the second sub backlight module source are connected with the backlight driving circuit.

\* \* \* \* \*